Figure 1:
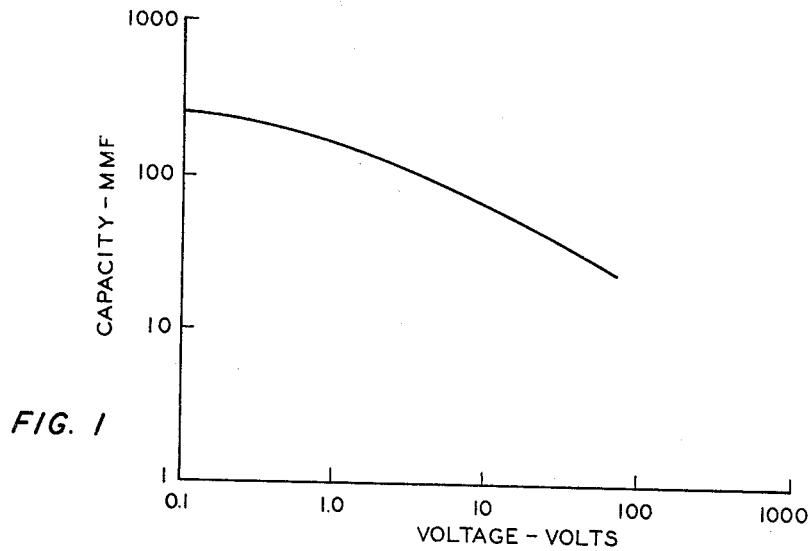

April 6, 1965 L. E. KUNTZ ETAL 3,177,427
CAPACITANCE BRIDGE COMPENSATING CIRCUIT UTILIZING
VOLTAGE SENSITIVE CAPACITORS
Filed Feb. 26, 1962 3 Sheets-Sheet 1

INVENTORS
L. E. KUNTZ
D. A. FLUEGEL
BY
*Young + Quigg*
ATTORNEYS

INVENTORS
L. E. KUNTZ
D. A. FLUEGEL
BY
Young & Quigg
ATTORNEYS

INVENTORS.
L. E. KUNTZ
D. A. FLUEGEL
BY
*Young & Quigg*
ATTORNEYS

United States Patent Office 3,177,427
Patented Apr. 6, 1965

3,177,427
CAPACITANCE BRIDGE COMPENSATING
CIRCUIT UTILIZING VOLTAGE SENSI-
TIVE CAPACITORS
Louis E. Kuntz and Dale A. Fluegel, Bartlesville, Okla.,
assignors to Phillips Petroleum Company, a corporation of Delaware
Filed Feb. 26, 1962, Ser. No. 176,497
10 Claims. (Cl. 324—61)

This invention relates to electrical measuring. In one aspect the invention relates to the detection and analysis of materials in terms of the dielectric constant thereof. In another aspect the invention relates to an improved apparatus and method for determining variations in capacitance. In yet another aspect the invention relates to a novel and improved capacitance bridge network. In another aspect the invention relates to improved method and apparatus for correcting a capacitance measuring cell output for changes in temperature. In a still further aspect the invention relates to adjusting a capacitance measuring bridge network to compensate for changes in capacitance of the measuring cell due to changes in temperature. In yet another aspect the invention relates to adjusting a capacitance measuring network to compensate for changes in capacitance of the measuring cell due to factors other than the variable it is desired to measure. In another aspect the invention relates to method of and means for compensating a capacitance measuring network for changes in the capacitance of the measuring capacitor due to changes in specific gravity of the dielectric material of said measuring capacitor. This application is a continuation-in-part of the now abandoned application Serial No. 156,621, filed December 4, 1961.

The measurement of the dielectric properties of materials has become a valuable industrial and laboratory procedure for determining compositions. A detecting element in the form of an electrical condenser is disposed so that the material to be measured forms the dielectric. A measurement of the capacitance of the condenser thus provides information regarding the properties of the test material. This procedure can be employed to detect liquid levels, the moisture content of materials, the composition of materials, the density of materials, the specific gravity of materials, the basic sediment and water content of crude oil, and the thickness of sheets of the materials, for example. The accuracy of the measurement depends primarily on the accuracy of the measurement of the capacitance of the resulting capacitor and the compensation for changes in capacitance of the capacitor due to changes in temperature or other fatcors other than the variable being measured.

Various systems have been proposed in an attempt to solve the problem of capacitance variations due to changes in factors other than the variable being measured. However, many of such systems have been overly complicated or unreliable. In accordance with the present invention improved method and apparatus are provided for determining the dielectric properties of materials. In accordance with one embodiment of the invention there is provided an electrical network for compensating for variations in the capacitance of a measuring capacitor due to changes in factors other than the variable being measured, comprising a voltage sensitive capacitor network, means for producing a D.C. voltage, means for varying said D.C. voltage responsive to said changes in said factors other than said variable being measured, and means for applying the thus varied D.C. voltage to said voltage sensitive capacitor network.

In a second embodiment of the invention there is provided an electrical network for compensating for variations in the capacitance of a measuring capacitor due to changes in the temperature of the dielectric material of said measuring capacitor comprising a voltage sensitive capacitor network, means for producing a D.C. voltage, means for measuring the temperature of said dielectric material, means for varying said D.C. voltage responsive to changes in the measurement of the temperature of said dielectric material, and means for applying the thus varied D.C. voltage to said voltage sensitive capacitor network. The voltage sensitive capacitor network comprises at least one voltage sensitive capacitor, such as a silicon or germanium capacitor. If only one voltage sensitive capacitor is utilized, it is generally desirable that biasing means be utilized to maintain the voltage-sensitive capacitor in a non-conducting state. The now preferred voltage-sensitive network comprises two voltage sensitive capacitors connected in series and means for applying the varied D.C. voltage to the junction between the two voltage sensitive capacitors.

Accordingly, it is an object of the invention to provide an improved and simplified apparatus and method for measuring the capacitance of a capacitor. Another object of the invention is to provide a temperature compensating network of increased accuracy and simplicity. Another object of the invention is to provide improved apparatus for detecting and analyzing materials in terms of the dielectric properties thereof. Another object of the invention is to provide a temperature compensating network for use in measuring the dielectric properties of a material. Yet another object of the invention is to provide improved method and apparatus for measuring the density of a test fluid. A still further object of the invention is to provide improved method and apparatus for measuring the basic sediment and water content of crude oil. Yet another object of the invention is to provide method and apparatus for compensating a capacitance measuring network for variations in capacitance due to changes in factors other than the variable being measured.

Other aspects, objects, and the several advantages of the invention will be apparent from a study of the disclosure, the drawing and the appended claims.

Figure 3:
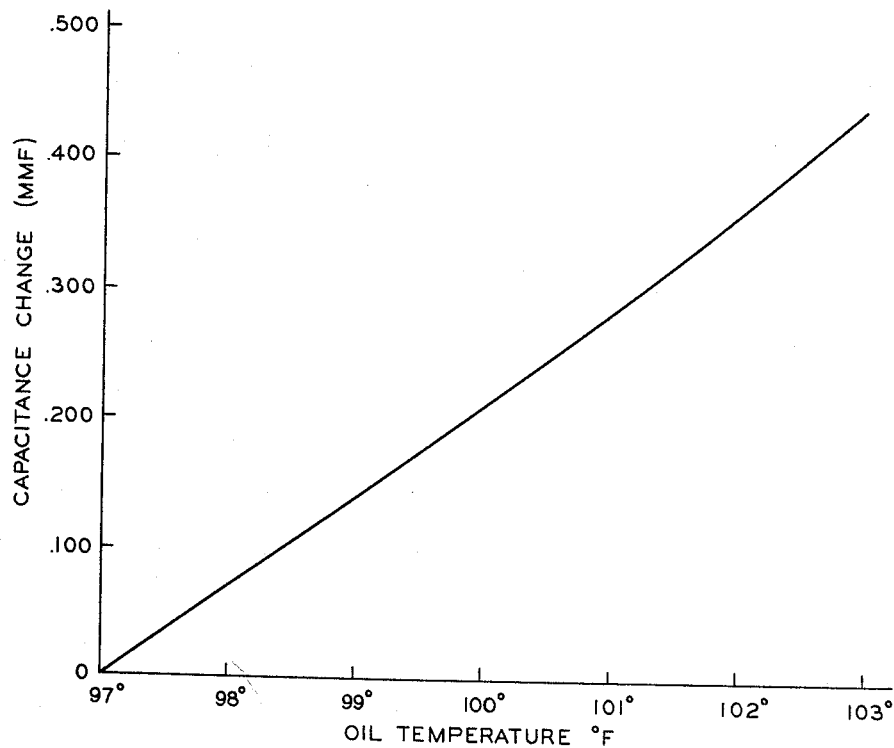
Figure 2:
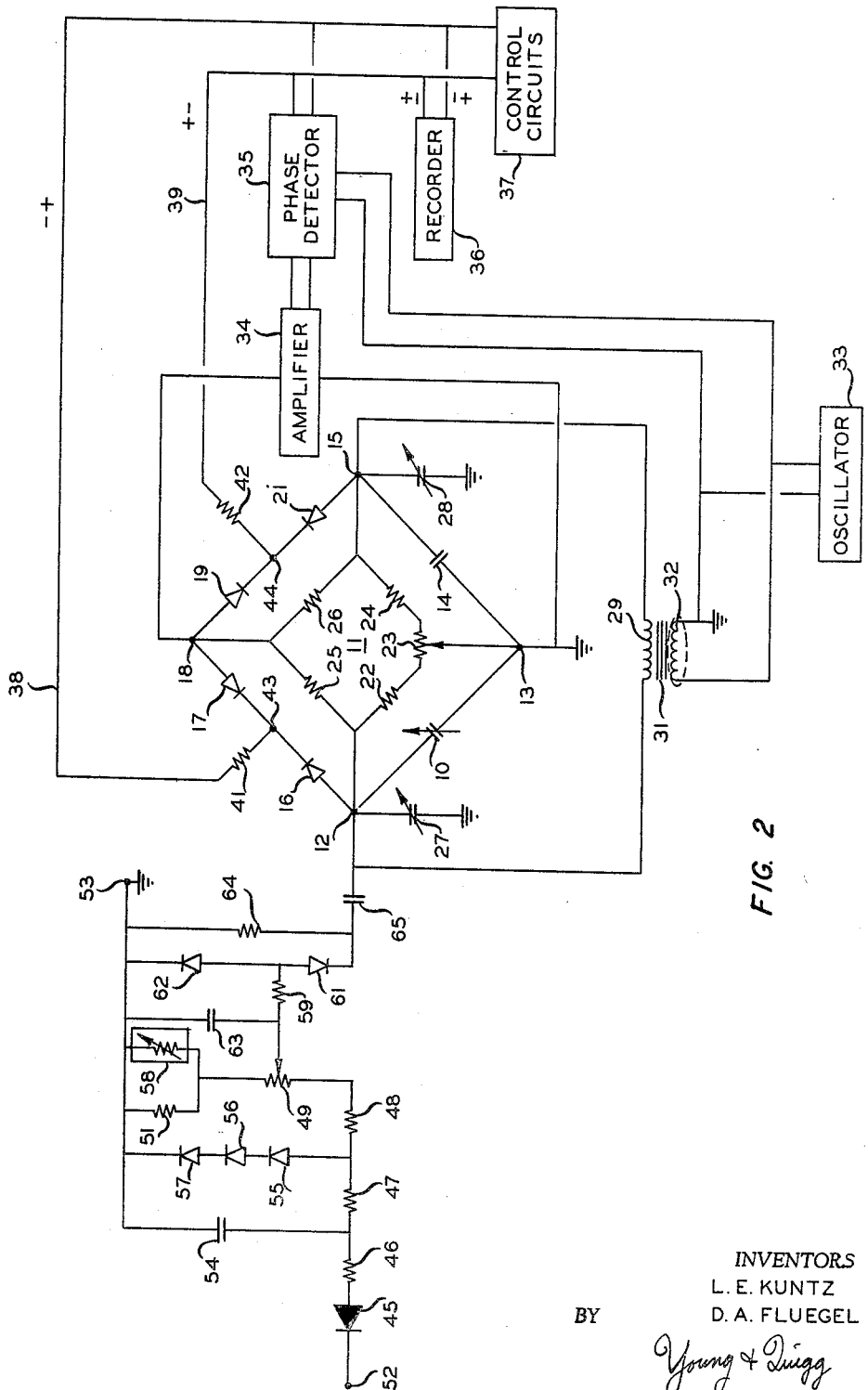
Figure 4:
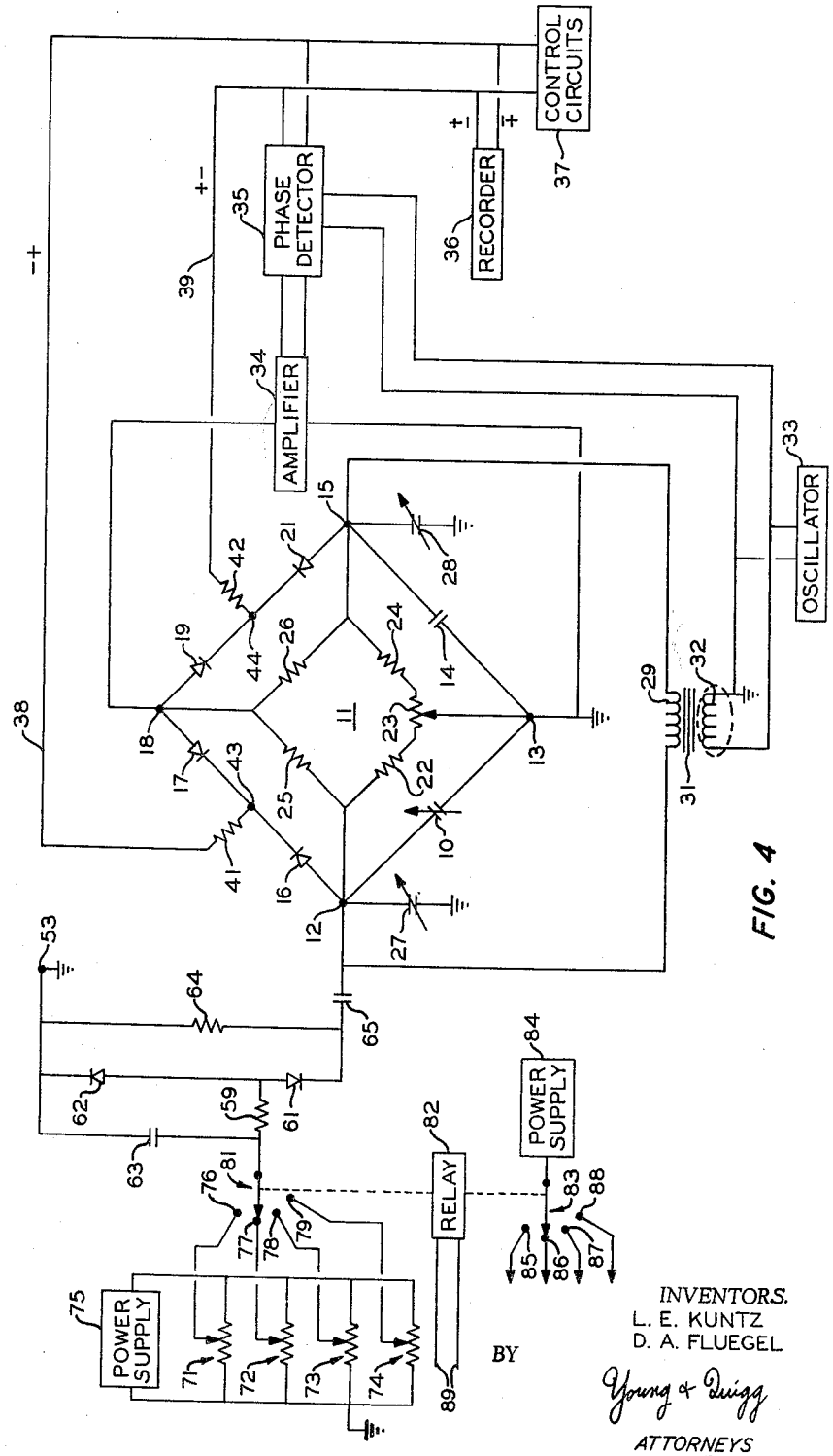

In the drawings FIGURE 1 is a graph showing a typical voltage versus capacity curve for silicon capacitors; FIGURE 2 is a schematic representation of a temperature compensated bridge network for capacitance measurement in accordance with a first embodiment of the invention; FIGURE 3 is a temperature versus capacitance curve of the temperature compensator of one model of the invention; and FIGURE 4 is a schematic representation of a compensated bridge network for capacitance measurement in accordance with a second embodiment of the invention.

Silicon capacitors, which are particularly suitable for use in the invention, are p-n junctions formed in single-crystal silicon by techniques used in the manufacture of semiconductor devices. At a p-n junction the density of charge carriers (electrons in the n-region and holes in the p-region) is reduced virtually to zero when a voltage is applied across the junction in the reverse direction from that causing easy current flow. As the voltage increases, the region of zero carrier density, known as the depletion region, gets wider. In effect this moves apart the two conducting areas and decreases the capacity as if there were two metal plates separated by a dielectric whose thickness was variable. The area of the plates remains the same; the dielectric constant is unchanged; but the thickness of the dielectric varies according to the applied voltage.

The junction can be biased at any desired value as low as zero volt (or even up to 0.4 volt in the opposite direction) regardless of the magnitude of the signal voltage.

In the normal bias direction, the capacity will continue to decrease as the voltage is increased. Thus, as shown in FIGURE 1, the capacity of a typical silicon capacitor can decrease from a value of approximately 240 mmf. corresponding to an applied voltage of 0.1 volt to a value of approximately 30 mmf. corresponding to an applied voltage of 50 volts. As the voltage in the normal bias direction is decreased the capacity will increase.

In FIGURE 2 there is shown a preferred embodiment of the invention wherein capacitor 10 comprises the detecting element employed to measure the dielectric properties of a test material. This capacitor can be of various configurations, depending upon the particular application of the instrument. If the thickness of a sheet of material is to be measured, the capacitor can be in the form of a pair of spaced plates having the test material therebetween. In detecting liquid levels, it is convenient to employ an elongated probe element which comprises an open cylinder having a second electrode disposed axially therein. Capacitor 10 can be a measuring cell suitable for use in a Basic Sediment and Water (BS&W) monitor. Detecting element 10 obviously can be in the form of two or more spaced electrodes. Two specific examples of suitable measuring elements are described in U.S. Patent 2,904,751, J. R. Parsons, issued September 15, 1959.

Capacitor 10 is connected in a bridge network 11. The two terminals of capacitor 10 are connected to terminals 12 and 13 of bridge 11. A reference capacitor 14 is connected between terminals 13 and a third terminal 15. Voltage sensitive capacitors 16 and 17 are connected in series in back to back relationship between terminal 12 and a fourth terminal 18. Voltage sensitive capacitors 19 and 21 are connected in series in back to back relationship between terminals 18 and 15. Suitable voltage sensitive capacitors are capacitors HC–7005 manufactured by Hughes Aircraft Co., of Newport Beach, California. A resistor 22, a potentiometer 23 and a resistor 24 are connected in series between terminals 12 and 15, with the contactor of potentiometer 23 being connected to terminal 13 which in turn is connected to ground. Resistors 25 and 26 are connected in series between terminals 12 and 15 with the junction between resistors 25 and 26 being connected to terminal 18. Bridge terminals 12 and 15 are connected to ground through balancing capacitors 27 and 28, respectively. Bridge terminals 12 and 15 are also connected to the respective end terminals of the secondary winding 29 of a transformer 31. While transformer 31 can be of conventional construction, the transformer disclosed in copending application Serial No. 659,683, filed May 16, 1957, by D. A. Fluegel, now U. S. Patent 3,032,-729, is preferred.

The primary winding 32 is energized from the output of an oscillator 33. Oscillator 33 can be a conventional type, such as one utilizing a transistor with suitable tuned circuits, and which is adapted to produce an A.C. signal having a suitable frequency, such as 40 kc.

Output terminals 13 and 18 of bridge network 11 are connected to the respective input terminals of high gain amplifier 34. The output terminals of amplifier 34 are connected to a first pair of input terminals of phase detector 35. While amplifier 34 and phase detector 35 can be of any suitable conventional design, the amplifier and phase detector disclosed in D. A. Fluegel and E. D. Tolin, U.S. Patent 2,982,911, are preferred. The output of oscillator 33 is applied to a second pair of input terminals of phase detector 35. The output terminals of phase detector 35 can be connected to recorder 36 and/or control circuits 37 as desired. A portion of the output signal from phase detector 35 is transmitted through leads 38 and 39 and resistors 41 and 42 to the junction 43 between voltage sensitive capacitors 16 and 17 and the junction 44 between voltage sensitive capacitors 19 and 21, respectively.

A rectifier 45, resistors 46, 47 and 48, span adjusting potentiometer 49 and resistor 51 are connected between an A.C. power supply terminal 52 and ground terminal 53. Capacitor 54 is connected between the junction of resistors 46 and 47 and ground terminal 53 to filter out A.C. ripple effects. Zener diodes 55, 56 and 57 are connected between the junction of resistors 47 and 48 and ground terminal 53 to maintain the D.C. voltage across elements 48, 49, and 51 at a predetermined value. A thermistor element 58 is connected in parallel with resistor 51. Thermistor element 58 can be positioned adjacent measuring capacitor 10 so as to be in thermal contact therewith. Resistor 59 is connected between the contactor of potentiometer 49 and the junction between voltage sensitive capacitors 61 and 62, which are connected in anode-to-anode relationship. Capacitor 63 is connected between the contactor of potentiometer 49 and ground terminal 53 to eliminate any A.C. ripple or noise effects from the D.C. voltage applied to the junction between voltage sensitive capacitors 61 and 62. While the invention encompasses the utilization of only one voltage sensitive capacitor in the temperature compensating network, it is presently preferred to utilize two voltage sensitive capacitors connected in back to back relationship to compensate for any non-linearity of the voltage sensitive capacitors. Whether the connection of the two voltage sensitive capacitors is anode-to-anode or cathode-to-cathode depends upon the polarity of the D.C. voltage applied to the junction and/or the polarity of the bias voltage. The cathode of voltage sensitive capacitor 62 is connected to ground terminal 53 while the cathode of voltage sensitive capacitor 61 is connected to ground terminal 53 through a resistor 64. A D.C. isolation capacitor 65 is connected between the junction of voltage sensitive capacitor 61 and resistor 64 and bridge terminal 12.

The operation of FIGURE 2 will now be described. The output of oscillator 33 is applied through transformer 31 across terminals 12 and 15 of bridge network 11. It should be obvious that this network forms a capacity bridge. If the bridge is balanced there is a zero potential difference between terminals 13 and 18. However, any unbalance of the bridge due to a change in capacitance of measuring capacitor 10 and/or the temperature compensating capacitors 61 and 62 results in a potential at terminal 18 changing from ground potential. Any unbalance in the resistances 22, 23, and 24 or any change in the loss factor of the material in measuring capacitor 10 results in the potential at terminal 18 changing from ground potential. This latter potential is 90° out of phase with the potential due to change in capacity of measuring capacitor 10 and/or the temperature compensating capacitors 61 and 62. Any change in temperature of the material which forms the dielectric for measuring capacitor 10 causes a change in the voltage output of the thermistor 58, which in turn causes a change in the D.C. voltage applied from the contactor of potentiometer 49 to the anodes of voltage sensitive capacitors 61 and 62, which in turn causes a change in capacitance of capacitors 61 and 62, thus varying the capacitance between bridge terminal 12 and ground. The capacitance change of measuring capacitor 10 is responsive to changes in the dielectric and to changes in the temperature of the dielectric while the capacitance change of voltage-sensitive capacitors 61 and 62 is responsive only to changes in the temperature of the dielectric. The capacitance change of the voltage-sensitive capacitors 61 and 62 opposes and nullifies that part of the capacitance change of measuring capacitor 10 that is due to variations in the temperature of the dielectric material of measuring capacitor 10. The unbalanced signal at terminal 18 is applied to the input terminals of amplifier 34 wherein the unbalanced signal is amplified. The amplified signal is applied to the first pair of input terminals of phase detector 35 while a reference signal from oscillator 33 is applied to a second pair of input signals of phase detector 35. Thus, the two signals applied to phase detector 35 are of the same frequency because they are both obtained from oscillator 33.

Phase detector 35 provides a D.C. output signal, the magnitude of which is determined by the amplitude and phase of the A.C. signal produced by bridge network 11. When bridge network 11 is balanced, the output of phase detector 35 can be set at zero or at some other value by a biasing arrangement. If the capacitance of capacitor 10 should become greater than that of capacitor 14, bridge network 11 is unbalanced in a first direction. If the capacitance of capacitor 10 becomes less than that of capacitor 14, the bridge network is unbalanced in the opposite direction. The phase of the output signal from the bridge thus changes by 180° when the direction of the unbalance changes. When the bridge output signal is in phase with the oscillator output, the D.C. output signal of phase detector 35 will be increased over its value for a balanced bridge condition; whereas if the bridge output signal is out of phase with the oscillator output, the D.C. output signal of phase detector will be decreased from its value for a balanced bridge condition.

A portion of the output signal from phase detector 35 is applied to junction 43 and 44 with the signal at junction 43 being the opposite polarity from the signal at junction 44 (or the signal applied to one junction being less positive than the signal applied to the other junction, depending on the value of the output signal of phase detector 35 at balanced bridge condition). This results in the capacity of the voltage sensitive capacitors in one arm being increased while the capacity of the voltage sensitive capacitors in the other arm is decreased. The change in capacity of voltage sensitive capacitors 16, 17, 19 and 21 in response to the D.C. rebalancing signal returns the bridge network to a substantially balanced condition.

Bridge network 11 is balanced initially by varying balancing capacitors 27 and 28 and potentiometer 23 until the recorder 36 reads zero or a predetermined value with a reference material disposed between the plates of capacitor 10.

While the temperature compensating network has been described in conjunction with a preferred capacitance measuring bridge network, the temperature compensating network of the invention can be utilized with any suitable means for measuring the dielectric properties of a material, as for example, the capacitance bridge network disclosed in D. A. Fluegel and E. D. Tolin, U.S. Patent 2,982,911, issued May 2, 1961, and the single-ended tank circuit network disclosed in J. R. Parsons, U.S. Patent 2,859,757, issued November 11, 1958.

Also, while the temperature compensating network has been described utilizing a thermistor, any suitable thermal sensitive means adapted to vary the voltage applied across the voltage-sensitive capacitors responsive to changes in temperature of the capacitor to be compensated can be utilized. If it is desired to utilize only one voltage-sensitive capacitor, suitable biasing means can be provided to maintain the voltage-sensitive capaictor in a non-conducting state.

As a further illustration of the utilization of the invention, and not in limitation thereof, one application of the temperature compensating network of the invention is in combination with a density (API gravity) measuring system for crude oil which utilizes a gravity-capacitance monitor and a capacitance measuring network. The new circuit embodying the invention makes it possible to compensate the monitor for density changes caused by changes in temperature. The final output is in ° API at a known reference temperature. Previously it was necessary to measure and read out the temperature of the sample each time the "observed" gravity reading was made, and then use API tables to convert the "observed" reading to "corrected" gravity (at 60° F.). FIGURE 3 illustrates the change in capacitance versus changes in temperature of one embodiment of the temperature compensating network of the invention which was utilized in a system where the crude oil gravities varied from 38 to 47° API and the sample temperature varied from 97 to 103° F.

Referring now to FIGURE 4 there is shown a second embodiment of the invention which can be utilized for compensating a single capacitance monitor to measure the BS&W content of crude oil from several different leases without the necessity for recalibration or use of a seperate reference cell for each lease due to variations in the dielectric constant for different crude oils. For purposes of simplicity the components in FIGURE 4 are labeled in accordance with FIGURE 2 insofar as the two circuits are the same. Potentiometers 71, 72, 73 and 74 are connected in parallel with power supply 75. The contactors of potentiometers 71–74 are connected to terminals 76–79, respectively. Switch 81 is adapted to connect one of terminals 76–79 through resistor 59 to the junction between voltage-sensitive capacitors 61 and 62. Capacitor 65 can be adjustable to provide a range or sensitivity adjustment for the magnitude of compensation. Switch 81 is actuated by relay 82 which can also be utilized to actuate switch 83 to connected power supply 84 to one of terminals 85–88 to actuate the appropriate sample valve such that a particular lease sample is selected to flow through measuring cell 10. Relay 82 can be actuated from a remote point by passing a signal along lines 89.

In operation each one of potentiometers 71–74 is adjusted to cause voltage sensitive capacitors 61 and 62 to shift the bridge zero adjustment by an amount equal and opposite to the zero shift caused by the change in the dielectric constant of the crude oil for the lease sample being monitored.

A particular advantage of this system in addition to elimination of separate reference cells is that the compensating voltage for each lease sampled can be transmitted as a D.C. signal over a common line to the measuring cell at a remote location. There is no need for coaxial relays as would be required if individual compensating capacitors were switched in and out of the bridge circuit.

The system of FIGURE 4 can be utilized to adjust a capacitance network to compensate for changes in the capacitance of the measuring cell due to factors other than the variable it is desired to measure. Thus if it is desired to measure the moisture content of samples from various streams having different temperatures, potentiometers 71–74 can be adjusted to compensate for the different temperatures.

As noted above, the drawing is merely a schematic representation and is not intended to fully show all component parts of the equipment which one skilled in the art will routinely design for the operation. Indeed, the showing of an element or piece of equipment does not mean that all such or similar pieces which may or can be designed by one skilled in the art in possession of this disclosure cannot be utilized as substitution therefor; likewise, the omission of an element which one skilled in the art may include in an actual unit does not mean that such an element is intended to be omitted simply because it does not appear in the drawing. Thus, in some applications of the invention, it is desirable to compare the dielectric of a test material with that of a similar reference material, in which case capacitors 10 and 14 can be identical. In other applications capacitor 14 can be made adjustable to aid in initially balancing the bridge and/or to provide for programmed changes in the reference value. Various methods are available for initially balancing the bridge network. Suffice to say, the drawing is for illustrative purposes, as is the description thereof.

Reasonable variation and modification are possible within the scope of the disclosure, the drawings and the appended claims to the invention.

We claim:

1. Electrical measuring apparatus comprising in combination:

(1) a bridge network comprising first, second, third, and fourth bridge terminals, a measuring capacitor connected between said first and second bridge terminals, a reference capacitor connected between said second and third bridge terminals, first and second voltage-sensitive capacitors connected in series in back-to-back relationship between said first and fourth bridge terminals, and third and fourth voltage-sensitive capacitors connected in series in back-to-back relationship between said fourth and third bridge terminals;

(2) a voltage source comprising a source of A.C. voltage, and means for connecting said source of A.C. voltage across said first and third bridge terminals;

(3) an output circuit comprising means for amplifying the voltage between said second and fourth bridge terminals, a phase detector, means for applying the thus amplified voltage to said phase detector, and means for connecting said phase detector to said source of A.C. voltage;

(4) a rebalancing circuit comprising means for applying the output of said phase detector between a first junction between said first and second voltage-sensitive capacitors and a second junction between said third and fourth voltage-sensitive capacitors; and (5) a temperature compensating circuit comprising fifth and sixth voltage sensitive capacitors connected in series in back-to-back relationship between said first and second bridge terminals, means for measuring the temperature of the dielectric material of said measuring capacitor and for producing a voltage responsive thereto, and means for applying the thus produced voltage to the junction between said fifth and sixth voltage-sensitive capacitors.

2. An electrical network for compensating for variations in the capacitance of a first capacitor due to changes in the temperature of the dielectric material of said first capacitor comprising first and second voltage-sensitive capacitors, each of said first and second voltage-sensitive capacitors having an anode and a cathode, means connecting together the anodes of said first and second voltage-sensitive capacitors, means to connect the cathodes of said first and second voltage sensitive capacitors to the respective terminals of said first capacitor, a thermistor for producing a voltage responsive to the temperature of said dielectric material of said first capacitor; a first resistor, a potentiometer having first and second terminals, means connecting said thermistor and said first resistor in parallel between the cathode of said first voltage-sensitive capacitor and said first terminal of said potentiometer, means connecting the contactor of said potentiometer to the junction of said anodes of said first and second voltage-sensitive capacitors, and means for applying a substantially constant D.C. voltage between said second terminal of said potentiometer and said cathode of said first voltage-sensitive capacitor.

3. An electrical network for compensating for variations in the capacitance of a first capacitor due to changes in the temperature of the dielectric material of said first capacitor, comprising first and second silicon capacitors, each of said first and second silicon capacitors having an anode and a cathode, means connecting the anodes of said first and second silicon capacitors to a common junction, a first resistor connected between the cathodes of said first and second silicon capacitors, a D.C. isolation capacitor having first and second terminals, means connecting said first terminal of said D.C. isolation capacitor to said cathode of said second silicon capacitor, means to connect said second terminal of said D.C. isolation capacitor to a first terminal of said first capacitor, means to connect said cathode of said first silicon capacitor to the other terminal of said first capacitor, a thermistor for producing a voltage responsive to the temperature of said dielectric material of said first capacitor, a second resistor, a potentiometer having first and second terminals, means connecting said thermistor and said second resistor in parallel between said cathode of said first silicon capacitor and said first terminal of said potentiometer, a third resistor connected between the contactor of said potentiometer and said common junction, a second capacitor connected between said contactor and said cathode of said first silicon capacitor, and means for applying a D.C. voltage between said second terminal of said potentiometer and said cathode of said first silicon capacitor.

4. A network according to claim 3 wherein said means for applying comprises a source of A.C. potential having first and second terminals; a rectifier; fourth, fifth and sixth resistors; means connecting said rectifier and said fourth, fifth and sixth resistors in series between said first terminal of said source and said second terminal of said potentiometer; a plurality of Zener diodes connected in series between said cathode of said first silicon capacitor and the junction between said fifth and sixth resistors; a third capacitor connected between said cathode of said first silicon capacitor and the junction between said fourth and fifth resistors; and means connecting said second terminal of said source to said cathode of said first silicon capacitor.

5. An electrical network for compensating for variations in the capacitance of a first capacitor due to changes in the temperature of the dielectric material of said first capacitor, comprising a voltage sensitive capacitor, means for biasing said voltage sensitive capacitor so as to maintain said voltage sensitive capacitor in a non-conducting state, means for measuring the temperature of said dielectric material of said first capacitor, means for supplying a D.C. voltage, means responsive to the measurement of the temperature of said dielectric material of said first capacitor for varying said D.C. voltage, means for applying the thus varied D.C. voltage across said voltage sensitive capacitor, and means to connect said voltage sensitive capacitor in parallel with said first capacitor.

6. Electrical measuring apparatus comprising, in combination, a measuring capacitor having first and second terminals; first and second voltage sensitive capacitors connected in series in back-to-back relationship between said first and second terminals of said measuring capacitor, means for producing a D.C. voltage, means for varying said D.C. voltage responsive to changes in temperature of said measuring capacitor, means for applying the thus varied D.C. voltage to the junction between said first and second voltage sensitive capacitors, and means for measuring the total capacitance between said first and second terminals.

7. An electrical network for compensating for variations in the capacitance of a first capacitor due to changes in factors other than the variable being measured, comprising first and second silicon capacitors, each of said first and second silicon capacitors having an anode and a cathode, means connecting the anodes of said first and second silicon capacitors to a common junction, a first resistor connected between the cathodes of said first and second silicon capacitors, a D.C. isolation capacitor having first and second terminals, means connecting said first terminal of said D.C. isolation capacitor to said cathode of said second silicon capacitor, means to connect said second terminal of said D.C. isolation capacitor to a first terminal of said first capacitor, means to connect said cathode of said first silicon capacitor to the other terminal of said first capacitor, a D.C. voltage source, a plurality of potentiometers connected in parallel with said D.C. voltage source, each of said potentiometers having a contactor, means for connecting a selected one of said contactors to said junction between said first and second silicon capacitors.

8. An electrical network for compensating for variations in the capacitance of a first capacitor due to changes in factors other than the variable being measured, comprising a voltage sensitive capacitor, means for biasing said voltage sensitive capacitor so as to maintain said voltage sensitive capacitor in a non-conducting state, means for producing a D.C. voltage representative of the change in said factors, means for applying said D.C. voltage across said voltage sensitive capacitor, and means to connect said voltage sensitive capacitor in parallel with said first capacitor.

9. Electrical measuring apparatus comprising, in combination, a measuring capacitor having first and second terminals; first and second voltage sensitive capacitors connected in series in back-to-back relationship between said first and second terminals of said measuring capacitor, means for producing a D.C. voltage, means for varying said D.C. voltage responsive to changes in factors affecting the capacitance of said measuring capacitor other than the variable being measured, means for applying the thus varied D.C. voltage to the junction between said first and second voltage sensitive capacitors, and means for measuring the total capacitance between said first and second terminals.

10. Apparatus in accordance with claim 9 wherein said first and second voltage sensitive capacitors are silicon capacitors.

References Cited by the Examiner
UNITED STATES PATENTS 2,956,234   10/60   Olsen _____ 323—75

WALTER L. CARLSON, *Primary Examiner.*